United States Patent
Dumas

(10) Patent No.: US 12,461,540 B2
(45) Date of Patent: Nov. 4, 2025

(54) METHOD FOR GENERATING A TRAJECTORY ELEMENT, ASSOCIATED GENERATION SYSTEM AND AIRCRAFT COMPRISING SUCH A GENERATION SYSTEM

(71) Applicant: THALES, Courbevoie (FR)

(72) Inventor: Pierre-Yves Dumas, Valence (FR)

(73) Assignee: THALES, Courbevoie (FR)

( * ) Notice: Subject to any disclaimer, the term of this patent is extended or adjusted under 35 U.S.C. 154(b) by 184 days.

(21) Appl. No.: 18/316,436

(22) Filed: May 12, 2023

(65) Prior Publication Data
US 2023/0376050 A1 Nov. 23, 2023

(30) Foreign Application Priority Data
May 18, 2022 (FR) ........................ 22 04702

(51) Int. Cl.
*G05D 1/00* (2024.01)
(52) U.S. Cl.
CPC ..................... *G05D 1/106* (2019.05)
(58) Field of Classification Search
None
See application file for complete search history.

(56) References Cited

U.S. PATENT DOCUMENTS

| 8,370,006 | B2* | 2/2013 | Kumar | B61L 25/026 701/19 |
| 8,606,255 | B2* | 12/2013 | Li | H04W 8/30 455/418 |
| 8,660,715 | B2 | 2/2014 | Nicolas et al. | |
| 9,245,450 | B1* | 1/2016 | Chiew | G08G 5/21 |
| 9,536,435 | B1* | 1/2017 | Shay | G08G 5/21 |
| 9,575,489 | B2* | 2/2017 | Roger | G05D 1/0077 |
| 11,538,346 | B2 | 12/2022 | Mere et al. | |
| 11,770,328 | B2* | 9/2023 | Reed | H04L 45/745 709/224 |
| 12,067,886 | B2* | 8/2024 | Klüßendorf | G08G 5/32 |

(Continued)

FOREIGN PATENT DOCUMENTS

FR    3 113 747    3/2022

OTHER PUBLICATIONS

Preliminary Search Report for FR 2204702 dated Jan. 13, 2023.

*Primary Examiner* — Donald J Wallace
*Assistant Examiner* — Robert L Pinkerton
(74) *Attorney, Agent, or Firm* — B. Aaron Schulman, Esq.; Stites & Harbison, PLLC

(57) ABSTRACT

A method for generating at least one trajectory element (T) for controlling an aircraft (1) according to the trajectory element (T), the generation method being at least partially implemented by a generation system (2) on board the aircraft (1), and comprising the steps of:
- receiving a first initial data stored in a first database (6), the first database (6) presenting a first predefined level of integrity, called the initial level of integrity;
- receiving a second initial data stored in a second database (8), the second database (8) presenting said initial level of integrity, the first database (6) being dissimilar relative to the second database (8);
- comparing at least one first trajectory data (D1) with at least one second trajectory data (D2);
- obtaining the trajectory element (T).

14 Claims, 4 Drawing Sheets

(56) References Cited

U.S. PATENT DOCUMENTS

| | | |
|---|---|---|
| 2011/0205040 A1* | 8/2011 | Van Wiemeersch .... B60R 25/00 340/426.1 |
| 2012/0173052 A1 | 7/2012 | Nicolas et al. |
| 2015/0362598 A1 | 12/2015 | Rollet et al. |
| 2016/0147224 A1 | 5/2016 | Roger et al. |
| 2016/0358482 A1* | 12/2016 | Jacotot ................. G05D 1/0077 |
| 2017/0132941 A1* | 5/2017 | Giovannini ............ G08B 23/00 |
| 2019/0266903 A1* | 8/2019 | Venkataramana ..... G01C 23/00 |
| 2020/0005654 A1 | 1/2020 | Mere et al. |
| 2021/0005096 A1* | 1/2021 | Casek ...................... G08G 5/21 |
| 2022/0171382 A1* | 6/2022 | Austria ................ G05D 1/0022 |

* cited by examiner

METHOD FOR GENERATING A TRAJECTORY ELEMENT, ASSOCIATED GENERATION SYSTEM AND AIRCRAFT COMPRISING SUCH A GENERATION SYSTEM

CROSS-REFERENCE TO RELATED APPLICATIONS

This application is a U.S. non-provisional application claiming the benefit of French Application No. 22 04702, filed on May 18, 2022, which is incorporated herein by reference in its entirety.

FIELD

The present invention relates to a method for generating a trajectory element for controlling an aircraft according to said trajectory element.

The present invention also relates to a system for generating a trajectory element for controlling an aircraft according to the trajectory element.

The present invention further relates to an aircraft comprising such a generating system.

The invention relates to the field of onboard avionics systems and their safe operation.

BACKGROUND

Some trajectories are determined from data stored in one or more databases.

Such trajectories comprise, for example, specific approach trajectories for implementing an approach operation of the RNP APCH (Required Navigation Performance APproaCH) type or of the RNP AR APCH (Required Navigation Performance Authorization Required APproaCH) type.

These trajectories, once obtained from the database(s), are critical for the safety of an aircraft that is controlled according to these trajectories. Indeed, errors in these trajectories are likely to cause serious consequences, particularly for the safety of the aircraft and the crew.

Therefore, such trajectories must present a high level of integrity that is predefined.

EP 3 591 480 A1 proposes a system comprising a monitoring unit presenting a high level of integrity in order to validate generated data. The monitoring unit then comprises databases presenting this high level of integrity to enable validation.

However, monitoring by a unit presenting such a high level of integrity implies high requirements, in particular with respect to the hardware and software resources used. The system of EP 3 591 480 A1 is thus complex.

SUMMARY

One aim of the invention is then to at least reduce these drawbacks. In particular, one aim of the invention is to obtain a method for generating a trajectory element that presents fewer requirements with respect to the hardware and software resources used for generating the trajectory element, while achieving high level of integrity for the trajectory element.

To this end, the invention has as its object a method of generating at least one trajectory element for controlling an aircraft according to the trajectory element, the method of generation being at least partially implemented by a generation system on board the aircraft, and comprising steps of:

receiving a first initial data item stored in a first database, the first database presenting a first predefined level of integrity, called the initial level of integrity;

receiving a second initial data item stored in a second database, the second database presenting said initial level of integrity, the first database being dissimilar relative to the second database;

comparing, by at least one predetermined comparison function, at least one first trajectory data item relative to the first initial data item with at least one second trajectory data item relating to the second initial data item, to obtain a comparison result;

obtaining the trajectory element as a function of the comparison result, and as a function of at least one of the first trajectory data item and the second trajectory data item, the trajectory element presenting a second predefined level of integrity, referred to as the target level, the target level of integrity being strictly greater than said initial level of integrity.

The generation method presents fewer requirements on the hardware and software resources used to generate the trajectory element and respects the high requirements regarding the integrity of the trajectory element, since the trajectory element presenting the target level of integrity is obtained from two databases presenting the initial level of integrity, by comparing the first trajectory data item with the second trajectory data item.

Thanks to the generation method, the databases are thus particularly simple, since the data contained in these databases and the databases themselves only present the initial level of integrity, thus facilitating the implementation of these databases.

Because the first database is dissimilar relative to the second database, a failure in one of the databases does not lead to an error in the trajectory element. Indeed, in this case, the failure is detected during the comparison step and the target level of integrity is thus obtained for the trajectory element.

According to other advantageous aspects of the invention, the generation method comprises one or more of the following features, taken alone or in any technically possible combination:

the initial level of integrity corresponds to a probability of occurrence of a failure less than or equal to $10^{-5}$ per hour of flight of the aircraft, and the target level of integrity corresponds to a probability of occurrence of a failure less than or equal to $10^{-7}$ per hour of flight of the aircraft;

the obtaining step is implemented by a transmission module, transmitting the trajectory element comprising the first trajectory data item or the second trajectory data item, when the comparison result comprises a validation of the first trajectory data item and of the second trajectory data item, the transmission module presenting the target level of integrity;

the obtaining step comprises generating an alert by a transmission module when the comparison result comprises the detection of an inconsistency between the first trajectory data item and the second trajectory data item, the obtaining step further comprising transmitting the first trajectory data item or the second trajectory data item, presenting the initial level of integrity;

the comparing step comprises comparing, by a first predetermined comparison function, the first trajectory } data item with the second trajectory data item, to obtain a first comparison result, and comprising comparing, by a second predetermined comparison function different from the first predetermined function of the first trajectory data item with the second trajectory data item to obtain a second comparison result;

the obtaining step comprises transmitting a first alert when the first comparison result comprises the detection of an inconsistency between the first trajectory data item and the second trajectory data item, and comprising the transmitting of a second alert when the second comparison result comprises detecting an inconsistency between the first trajectory data item and the second trajectory data item, the first predetermined comparison function and transmitting the first alert are implemented by a first type of equipment different from a second type of equipment implementing the second predetermined comparison function and transmitting the second alert the trajectory element comprises a final approach segment data block of an approach trajectory toward a landing point of the aircraft;

the first initial data item and the second initial data item each comprise at least one element selected from the list constituted of: a landing runway threshold position, a terrain elevation data, an approach slope, a landing runway heading, an aircraft altitude constraint, an aircraft speed constraint, an obstacle position, and a radar signature;

the generating method further comprises the steps of:
  determining the first trajectory data item by applying a first transfer function to the first initial data item,
  determining the second trajectory data item by applying a second transfer function to the second initial data item, the second transfer function being different from the first transfer function, each of the first and second transfer functions present the initial level of integrity;

the first transfer function is implemented by a type of equipment different from a type of equipment implementing the second transfer function;

at least one, preferably all, of the following features defines that the first database is dissimilar to the second database:
  the first database is integrated in equipment of a first type, and the second database is integrated in equipment of a second type distinct from the first type;
  the first database and the second database are formatted by respective data formatting, a type of the formatting of the first database being distinct from a type of the formatting of the second database;
  the first initial data item is from a source different from the second initial data item;
  the first initial data item is a data item that is stored by a first database management software, and the second initial data item is a data item that is stored by a second database management software, different from the first software;

the generation method further comprises a step of validating the trajectory element, the validation step comprising a display of the trajectory element to a pilot and receiving a validation of the trajectory element from the pilot as a result of the display.

The invention also has as its object a system for generating a trajectory element for controlling an aircraft according to the trajectory element, the generation system comprising a first database presenting a first predefined level of integrity, referred to as an initial level of integrity, and a second database presenting said initial level of integrity, the first database being dissimilar relative to the second database, the generation system being configured to implement steps of:
  receiving a first initial data item stored in the first database;
  receiving a second initial data item stored in the second database; and
  comparing, by at least one predetermined comparison function, at least one first trajectory data item relating to the first initial data item with at least one second trajectory data item relating to the second initial data item, to obtain a comparison result,
  obtaining the trajectory element as a function of the comparison result, and as a function of at least one of the first trajectory data item and the second trajectory data item, the trajectory element presenting a second predefined level of integrity, referred to as the target level, the target level of integrity being strictly greater than said initial level of integrity.

The invention also has as its object an aircraft comprising a generation system as described above and comprising a control system for controlling the aircraft according to the trajectory element.

BRIEF DESCRIPTION OF THE DRAWINGS

These features and advantages of the invention will become apparent from reading the following description, given only as a non-limiting example, and made with reference to the appended drawings, in which.

DETAILED DESCRIPTION

Figure 1:
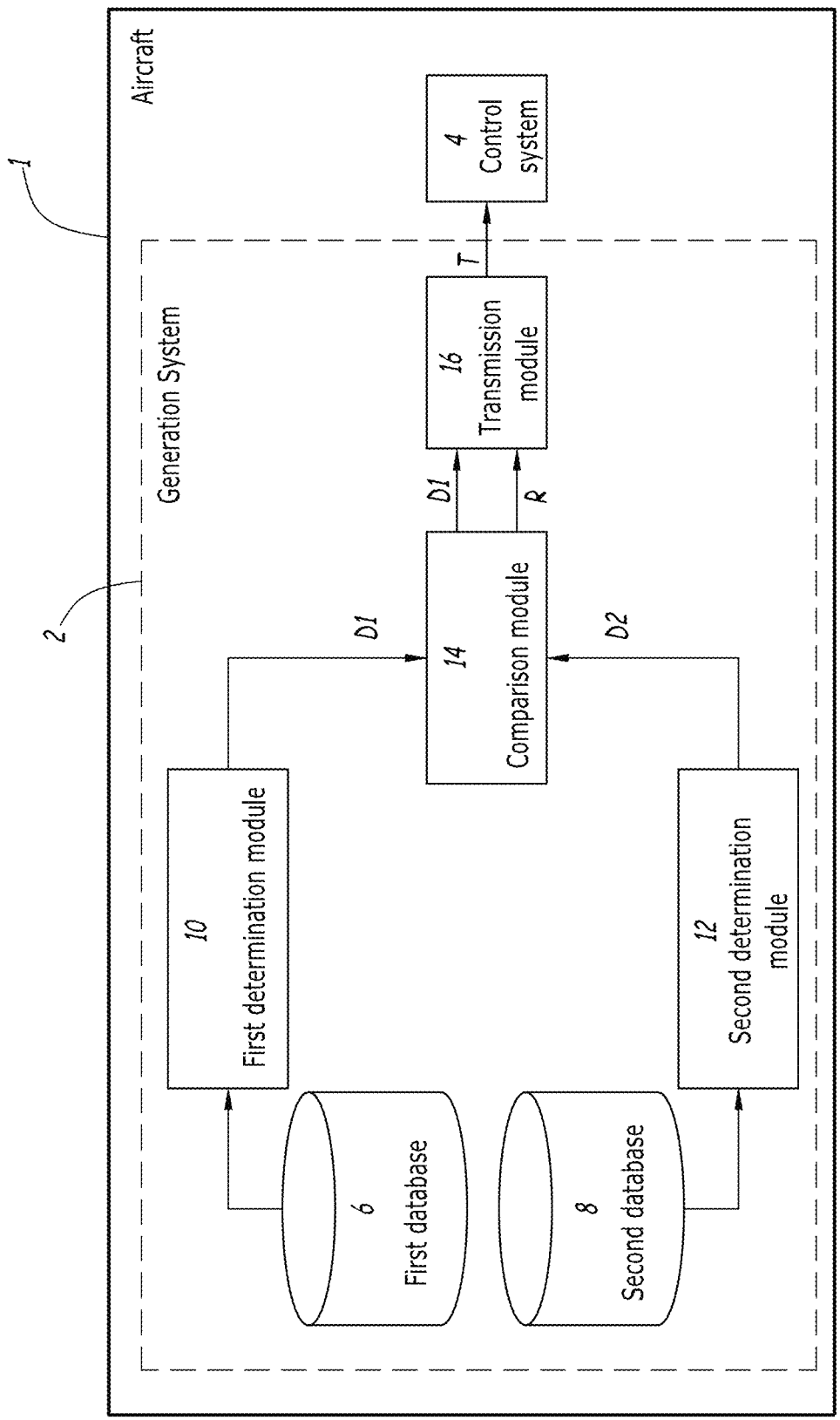
FIG. 1 is a schematic view of an aircraft comprising a system for generating a trajectory element according to a first embodiment.

In the present description, by the term "level of integrity" is meant a probability of occurrence of an element failure per hour of flight of an aircraft 1.

The element is for example a signal, a data, a function, in particular of a software, or an equipment.

By the expression "failure" is meant an error of the element, for example an erroneous value.

The level of integrity is defined as a function of the impact of a failure of the element concerned on the safety of the aircraft 1, classified in categories of failure conditions, between a "Minor" category corresponding to a failure condition that would not significantly reduce the safety of the aircraft 1, a "Major" category, a "Hazardous" category, up to a "Catastrophic" category corresponding to a failure condition that would result in the loss of the aircraft and/or the death of some of its occupants.

In the field of the invention, integrity represents in particular a degree of confidence in the accuracy of information, for example provided by a navigation system.

Each level of integrity corresponds, in the context of the invention, preferably to a standardized severity level according to definitions provided, for example according to definitions in the document "Certification Specifications and Acceptable Means of Compliance for Large Airplanes (CS-25)" of the European Aviation Safety Agency, in part AMC 25.1309 System design and analysis, in chapter 7, FAILURE CONDITION CLASSIFICATIONS AND PROBABILITY TERMS.

Each level of integrity is therefore preferably predefined, and in particular defined by a "Major", "Hazardous" or "Catastrophic" level.

In general, a probability of occurrence of a failure is associated with each category of failure condition, defining the respective required level of integrity. This is illustrated in the following table.

|  | Failure condition category | | | |
| --- | --- | --- | --- | --- |
|  | Minor | Major | Hazardous | Catastrophic |
| Occurrence Probability per hour of flight of the aircraft 1 | $10^{-3}$/h | $10^{-5}$/h | $10^{-7}$/h | $10^{-9}$/h |

The levels of integrity are furthermore associated with FDAL levels (Functional Development Assurance Level) according to the Aerospace Recommended Practice (ARP) ARP4754 directive, (version A of December 2010) of "SAE International" (Trademark).

FDAL levels apply to functions, such as software functions, but do not apply to databases or to a level of integrity of data itself.

FDAL levels are defined as follows: FDAL level A corresponds to the level of integrity required for the "Catastrophic" category, FDAL level B corresponds to the level of integrity required for the "Hazardous" category, FDAL level C corresponds to the level of integrity required for the "Major" category, and FDAL level D corresponds to the level of integrity required for the "Minor" category.

The levels of integrity are further associated with Data Process Assurance Levels (DPALs) according to the RTCA DO 200 Revision B standard, dated Jun. 8, 2015.

DPAL levels apply to databases, in particular to database generation processes and the data itself.

DPAL levels are defined as follows: DPAL level 1 corresponds to the level of integrity required for the categories "Catastrophic" and "Hazardous", DPAL level 2 corresponds to the level of integrity required for the "Major" and "Minor" categories, and DPAL level 3 corresponds to a level of integrity for a failure that has no impact on the safety of the aircraft 1.

Figure 2:
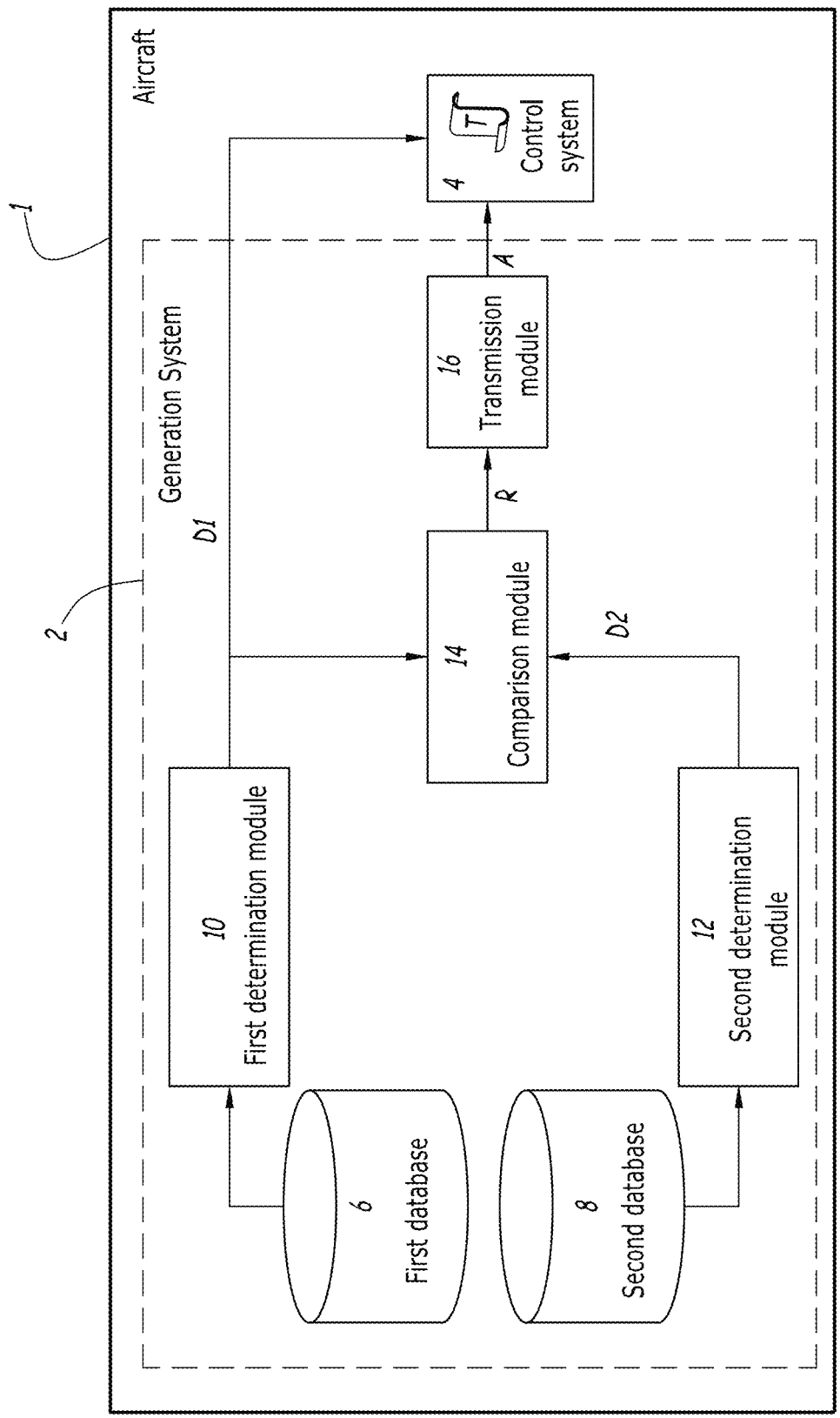
FIG. 2 is a schematic view of an aircraft comprising a system for generating a trajectory element according to a second embodiment.
Figure 3:
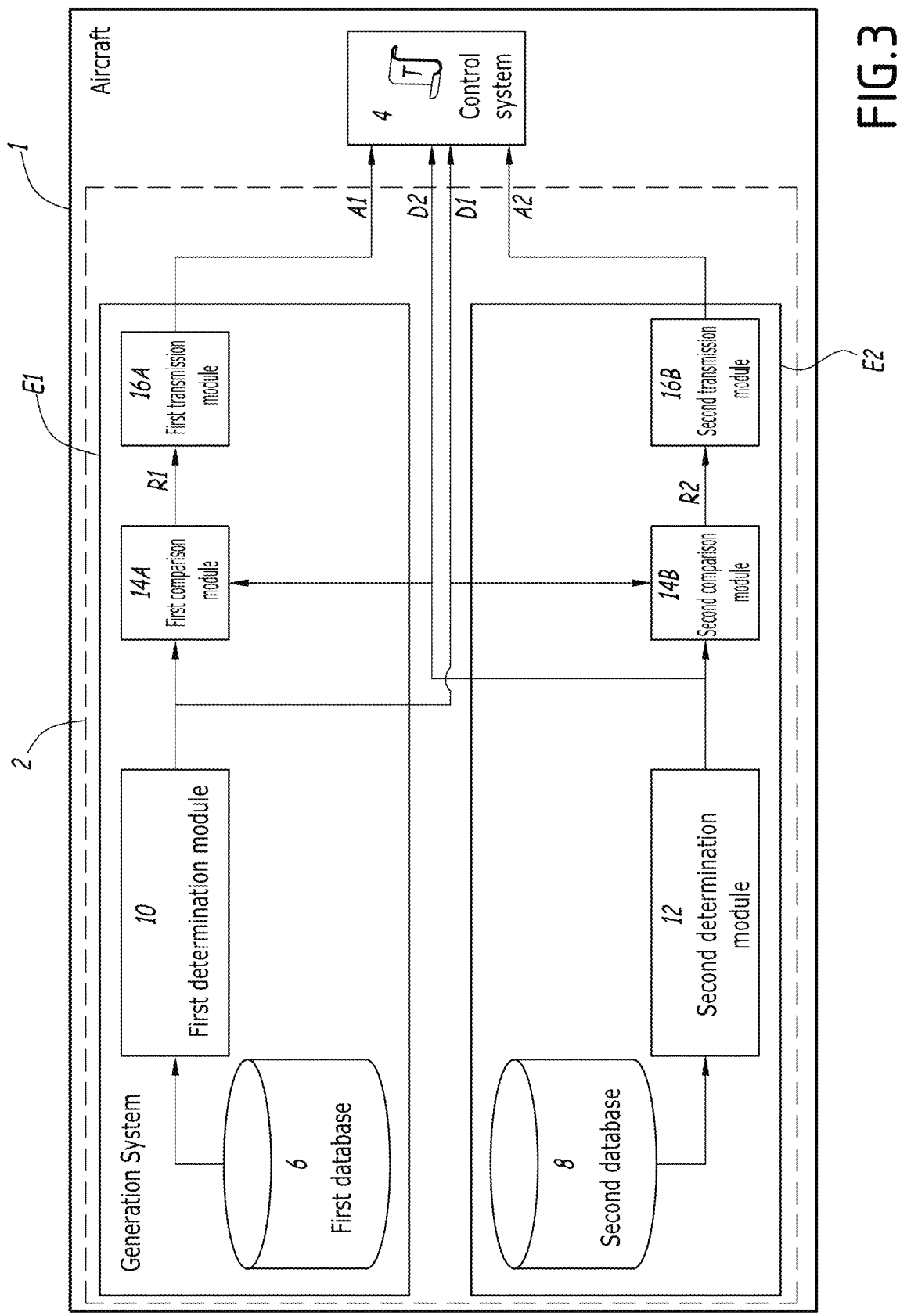
FIG. 3 is a schematic view of an aircraft comprising a system for generating a trajectory element according to a third embodiment.

With reference to FIGS. 1 to 3, the aircraft 1 comprises a generation system 2 for generating a trajectory element T and a control system 4 configured to control the aircraft 1 according to the trajectory element T.

The trajectory element T is, for example, a final approach segment data block or (FASDB) of an approach trajectory toward a landing point of the aircraft 1.

The trajectory element T is in particular a trajectory capable of implementing an approach operation of the RNP APCH type (Required Navigation Performance APproaCH) or of the RNP AR APCH type (Required Navigation Performance Authorization Required APproaCH).

The generation system 2 and the control system 4 are on board the aircraft 1.

First Embodiment of the Generation System

A first embodiment of the generation system 2 is now described with reference to FIG. 1.

The generation system 2 comprises a first database 6, a second database 8, a first determination module 10, a second determination module 12, a comparison module 14 and a transmission module 16.

The generation system 2 is configured to generate the trajectory element T, presenting a predefined level of integrity, referred to as target level of integrity, from data stored in the first database 6 and the second database 8, each presenting a predefined level of integrity, referred to as initial level of integrity.

According to the invention, the target level of integrity is strictly higher than the initial level of integrity.

By the expression "target level of integrity strictly higher than the initial level of integrity", it is understood that a probability of occurrence of a failure according to the target level of integrity is strictly lower than a probability of occurrence of a failure according to the initial level of integrity.

According to one example, the initial level of integrity corresponds to a probability of occurrence of a failure less than or equal to $10^{-5}$ per hour of flight of the aircraft 1, required for the "Major" category, and the target level of integrity corresponds to a probability of occurrence of a failure less than or equal to $10^{-7}$ per hour of flight of the aircraft 1, required for the "Dangerous" category.

The first database 6 is configured to store a first initial data item. The second database 8 is configured to store a second initial data item.

The first initial data item and the second initial data item each comprise, for example, at least one element selected from the list constituted of: a position of a landing runway threshold, a terrain elevation data, an approach slope, a landing runway heading, an altitude constraint of the aircraft 1, a speed constraint of the aircraft 1, an obstacle position and a radar signature.

The first database 6 and the second database 8 present the same level of integrity, namely the initial level of integrity, preferably the DPAL 2 level.

In particular, by the expression "the first database presents the initial level of integrity", it is understood that at least one of the following elements, preferably all of the elements, present the initial level of integrity: the first initial data item, a formatting of the first database 6, and a process for generating the first initial data item stored in the first database 6.

The phrase "the second database presents the initial level of integrity", is defined in an identical manner for the second database 8 instead of the first database 6, and for the second initial data item instead of the first initial data item.

The first database 6 is dissimilar relative to the second database 8.

By the term "first database dissimilar relative to the second database" or by the term "dissimilarity between the first and second databases" is meant a difference between the first and second databases 6, 8 with respect to at least one characteristic according to the following dissimilarity examples.

According to a first example of dissimilarity, the first database 6 is integrated in equipment of a first type, and the second database 8 is integrated in equipment of a second type distinct from the first type.

According to a second example of dissimilarity, the first database 6 and the second database 8 are formatted by respective data formatting, and a type of the formatting of the first database 6 is distinct from a type of the formatting of the second database 8.

According to a third example of dissimilarity, the first initial data item is from a different source than the second initial data item. For example, the first initial data item is data received by a first transformation of data from a state authority, and the second initial data item is data received by a second transformation, different from the first transformation of the data from the state authority.

According to a fourth example of dissimilarity, the first initial data item is a data item stored by a first database management software, and the second initial data item is a data item stored by a second database management software, different from the first software.

According to a fifth example of dissimilarity, the first initial data item is a different kind of data than the second initial data item.

Preferably, the first database 6 presents multiple dissimilarities relative to the second database 8 among the dissimilarity examples, preferably all of the dissimilarity examples.

The first determination module 10, the second determination module 12, the comparison module 14, and the transmission module 16 are each integrated into at least one computer, for example. In this case, each of the modules from among the first determination module 10, the second determination module 12, the comparison module 14, and the transmission module 16 presents at least partially in the form of software that can be executed by a processor and stored in a memory of the computer.

The first determination module 10 is configured to determine a first trajectory data item D1 by applying a first transfer function to the first initial data item. The first trajectory data item D1 is then a data item relative to the first initial data item.

The second determination module 12 is configured to determine a second trajectory data item D2 by applying a second transfer function to the second initial data item. The second trajectory data item D2 is then a data item relative to the second initial data item.

Preferably, the first transfer function is different from the second transfer function.

Preferably, the first determination module 10 and the second determination module 12 each presents the initial level of integrity, such as FDAL C. In particular, the first transfer function and the second transfer function present the initial level of integrity.

In addition, the first determination module 10 and the second determination module 12 are each integrated into equipment presenting the initial level of integrity.

The first determination module 10 is preferably dissimilar to the second determination module 12.

By the term "first determination module dissimilar to the second determination module" is meant a difference between the first and second determination modules 10, 12 according to at least one from among the following examples, preferably according to all of the following examples.

According to a first example of dissimilarity, the first determination module 10 is integrated into an equipment of a different type relative to an equipment in which the second determination module 12 is integrated.

In particular, the type of equipment configured to implement the first transfer function is different from the type of equipment configured to implement the second transfer function.

According to a second example of dissimilarity, the first transfer function is of a different type relative to a type of the second transfer function.

According to a third example of dissimilarity, the first transfer function is created by a different team or according to a specifications different from the second transfer function.

According to a fourth example of dissimilarity, the first transfer function is created in a technology (for example, computer language) different from the second transfer function.

The comparison module 14 is configured to compare, by a predetermined comparison function, the first trajectory data item D1 with the second trajectory data item D2, to obtain a comparison result R.

According to the first embodiment, the transmission module 16 is configured to transmit the trajectory element T when the comparison result R indicates a validation of the first trajectory data item D1 and the second trajectory data item D2. In this case, the trajectory element T comprises, and preferably consists of, the first trajectory data item D1 or the second trajectory data item D2.

According to the first embodiment, the comparison module 14 and the transmission module present the target level of integrity, in particular the FDAL B level.

Second Embodiment of the Generation System

The generation system 2 according to a second embodiment, illustrated in particular in FIG. 2, comprises the same features as those of the first embodiment, except for the differences described below.

The modules of the second embodiment corresponding to the first embodiment are denoted by the same reference signs.

According to the second embodiment, the comparison module 14 presents the initial level of integrity, in particular the FDAL C level.

The transmission module 16 is configured to receive the comparison result R and to transmit an alert A as a function of the comparison result R.

The transmission module 16 preferably presents the initial level of integrity, in particular the FDAL C level. For example, the transmission module 16 is integrated with the module 14 in the same equipment.

According to the second embodiment, not only are the modules 10 and 12 dissimilar, but also the modules 14 and 16 are dissimilar relative to the modules 10 and 12. As a result, it is in particular possible to obtain from the alert A and the first trajectory data item D1, each presenting the initial level of integrity, the trajectory element T which presents the target level of integrity.

Third Embodiment of the Generation System

The generation system 2 according to a third embodiment, illustrated in particular in FIG. 3, comprises the same features as those of the second embodiment, except for the differences described below.

The modules of the third embodiment corresponding to the third embodiment are denoted by the same reference signs.

The generation system 2 comprises a first and a second comparison module 14A and 14B, each presenting the initial level of integrity, in particular at least the FDAL C level. Each comparison module 14A and 14B is in particular identical to the comparison module 14 of the second embodiment.

The generation system 2 further comprises a first and a second transmission module 16A and 16B, each presenting the initial level of integrity, in particular at least the FDAL C level. Each transmission module 16A, 16B is in particular identical to the transmission module 16 of the second embodiment.

Preferably, the first database 6, the first determination module 10, the first comparison module 14A, and the first transmission module 16A are integrated in a same type of equipment E1 that is different from a type of equipment E2 integrating the second database 8, the second determination module 12, the second comparison module 14B, and the second transmission module 16B.

In each of these embodiments, the respective level of integrity preferably applies to the level of integrity of the equipment integrating the comparison module(s) 14 and to the level of integrity of a software of the comparison module 14, in particular of the predetermined comparison function.

Operation According to the First Embodiment

Figure 4:
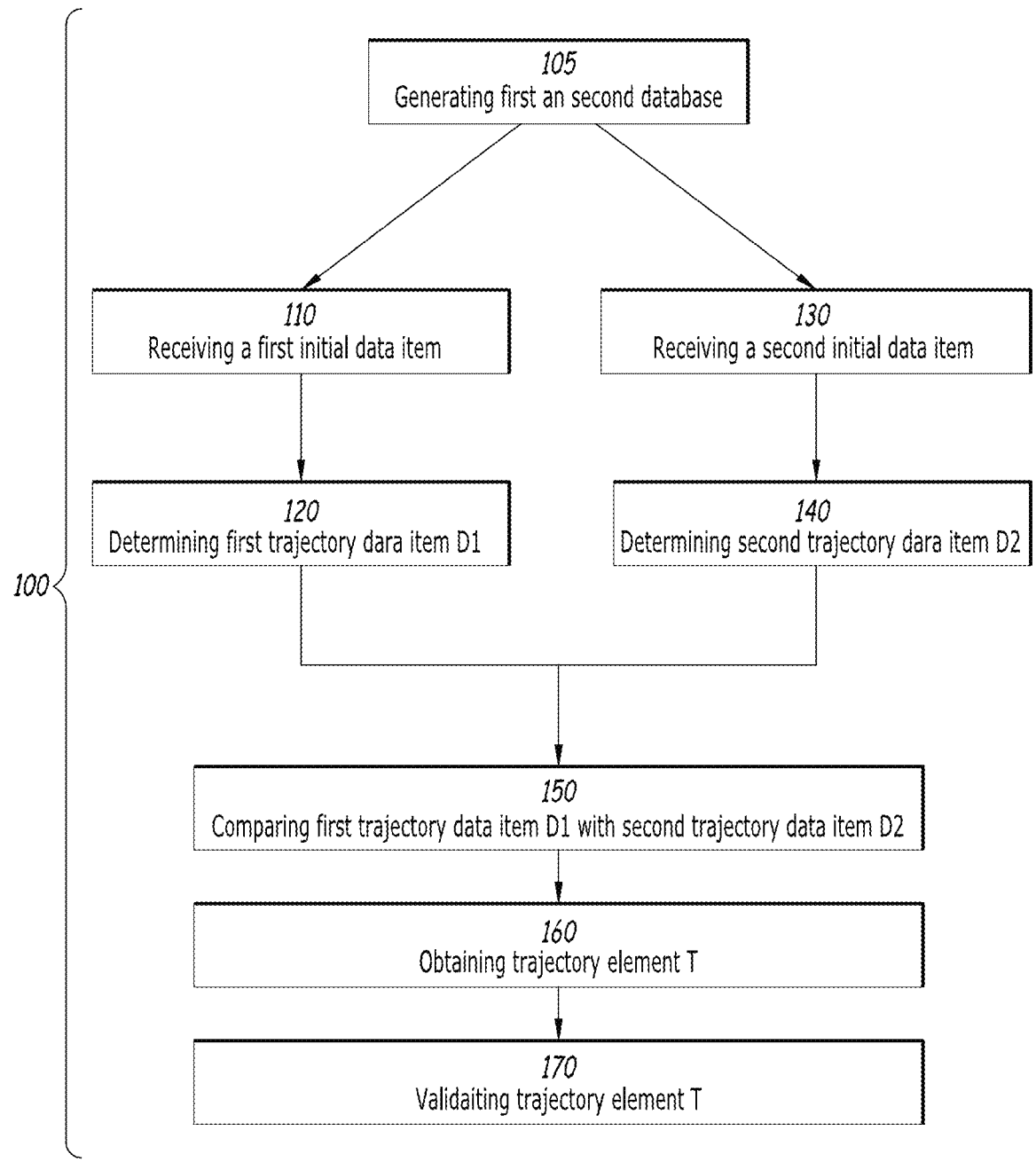
FIG. 4 is a flowchart of a method for generating a trajectory element implemented by the generation system according to any of FIG. 1, 2, or 3.

The operation of the generation system 2 according to the first embodiment is now described with reference to FIG. 1, and with reference to FIG. 4 comprising a flow chart of a generation method 100 of the trajectory element T.

The generation process 100 is implemented by the generation system 2 and comprises a preliminary step 105, a first reception step 110, a first determination step 120, a second reception step 130, a second determination step 140, a comparison step 150, an obtaining step 160, and a validation step 170.

During the preliminary step 105, the first database 6 and the second database 8 are generated, storing the initial first and second data items therein. According to one example, the preliminary step 105 comprises a preliminary validation of the initial data before storing in the databases 6, 8, for example by simulating the trajectories generated from the initial data item, verifying for example a minimum distance of these trajectories relative to the terrain, and/or verifying that the aircraft 1 remains in the predetermined flight conditions when following this trajectory.

During the first receiving step 110, the first determination module 10 queries the first database 6 and receives the first initial data item stored in the first database 6.

During the first determination step 120, the first determination module 10 determines the first trajectory data item D1 by applying the first transfer function to the first initial data item.

During the second receiving step 130, the second determination module 12 queries the second database 8 and receives the second initial data item stored in the second database 8.

During the second determination step 140, the second determination module 12 determines the second trajectory data item D2 by applying the second transfer function, different from the first transfer function to the second initial data item.

During the comparison step 150, the comparison module 14 compares, by the predetermined comparison function, the first trajectory data item D1 with the second trajectory data item D2, to obtain the comparison result R.

The comparison result R comprises, for example, either a validation of the first trajectory data item D1 and of the second trajectory data item D2, or a detection of an inconsistency between the first and second trajectory data item D1, D2.

In particular, the comparison result R generated by the comparison module 14 comprises the validation when the first trajectory data item D1 is identical to the second trajectory data item D2, or when the first and second trajectory data items D1, D2 are consistent with one another.

An example according to which the data items D1 and D2 are identical is described above as a first example implementation of the first embodiment. An example according to which the data items D1 and D2 are consistent with each other is described above as a second example implementation of the first embodiment.

In particular, the comparison result R comprises detecting an inconsistency either when the first trajectory data item D1 differs from the second trajectory data item D2, or when the trajectory data items D1, D2 are not consistent with each other.

According to the first embodiment, the comparison module 14 transmits the comparison result R and the first or second trajectory data item D1, D2 to the transmission module 16.

During the obtaining step 160, the trajectory element T is obtained as a function of the comparison result R and as a function of at least one of the first trajectory data item D1 and the second trajectory data item D2. Preferably, the trajectory element T is obtained only from the comparison result R, and at least one of the first trajectory data item D1 and the second trajectory data item D2, in other words, in particular in the absence of other data.

According to the example shown in FIG. 1, the transmission module 16 obtains the trajectory element T as a function of the result R and the data item D1. For example, the transmission module 16 transmits the trajectory element T comprising the first trajectory data item D1, when the comparison result R comprises the validation of the first trajectory data item D1 and the second trajectory data item D2. Preferably, in this case, the trajectory element T consists of the first trajectory data item D1.

The transmission module 16 transmits the trajectory element T, for example, to the control system for controlling the aircraft 1 according to this trajectory element T.

Thus, for example, the trajectory element T is equal to the first trajectory data item D1, validated during the comparison step 150. Due to this validation by the comparison during the comparison step 150, the trajectory element T presents the target level of integrity, although the first trajectory data item D1 and the second trajectory data item D2 considered in isolation, in other words, without comparing them to each other, only present the initial level of integrity.

When the comparison result R comprises the detection of an inconsistency, the transmission module 16 transmits, for example, an alert instead of the trajectory element T.

According to the first embodiment, the comparison module 14 and the transmission module 16 present the target level of integrity.

During the validation step 170, the trajectory element T is, for example, displayed to a pilot, in order to obtain a manual validation. When the displayed trajectory element T corresponds to an expected trajectory, the validation step 170 further comprises receiving a validation of the trajectory element T from the pilot, as a result of the display.

The validation step 170 is preferably implemented when the first initial data item is from a same source as the second initial data item. In this case, the dissimilarity of the first and second databases 6, 8 applies, for example, to the equipment integrating the databases 6, 8, but not to the first and second initial data item. The validation step 170 then provides additional validation to increase the level of integrity of the trajectory element T.

A first example implementation of the first embodiment is now described.

The first initial data item comprises a position of a runway threshold for the approach, and, for example, other data typically used for generating a data block of a final approach segment.

The second initial data item comprises the same type of data, stored in the second database 8 instead of the first database 6.

During the first determination step 120, the first determination module 10 determines a first final approach segment data block, referred to as FASDB1, forming the first trajectory data item D1, by applying the first transfer function to the first initial data item.

During the second determination step 140, the second determination module 12 determines a second final approach segment data block, referred to as FASDB2, by applying the second transfer function to the second initial data item.

During the comparison step 150, the comparison module 14 compares the FASDB1 with the FASDB2. The comparison function is, for example, a function comparing each bit of FASDB1 with each corresponding bit of FASDB2.

When FASDB1 is identical to FASDB2, the comparison result R comprises the validation of FASDB1 and FASDB2. This indicates in particular that each of the blocks FASDB1 is FASDB2 is correct.

In this case, the transmission module 16 transmits the trajectory element T, which is the FASDB1 validated by the comparison during the comparison step 150, to the control system 4 for controlling the aircraft 1 according to the FASDB1.

A second example implementation of the first embodiment is now described. The second example implementation comprises the same features as the first example implementation, except for the differences described below.

During the second receiving step 130, the second determination module 12 receives only a position of a runway threshold as a second initial data item.

During the second determination step 140, the second determination module 12 transfers the runway threshold position to the comparison module 14 as the second trajectory data item D2, in particular without transformation of the runway threshold position. Thus, according to the second example implementation, only the FASDB1 is determined, but not the FASDB2.

During the comparison step 150, the comparison module 14 compares the runway threshold position of the second trajectory data item D2 with the runway threshold position included in the FASDB1 of the first trajectory data item D1.

When the runway threshold positions are identical, it means that the FASDB1 determined by the first determination module 10 is correct since it points toward the correct runway threshold position. In this case, the transmission module 16 transmits the FASDB1 as the trajectory element T to the control system 4.

Operation According to the Second Embodiment

The operation of the generation system 2 according to the second embodiment is now described with reference to FIGS. 2 and 4.

The operation according to the second embodiment comprises the same features as that of the first embodiment, except for the differences described below.

Also, the first and second example implementations apply to the second embodiment, if need be, modified according to the following description.

The comparison step 150 is implemented by the comparison module 14 presenting the initial level of integrity.

During the comparison step 150, the comparison module 14 implements the same comparison between the trajectory data item D1 and D2 as described in the first embodiment but given that the module 14 presents only the initial level of integrity, the comparison result R presents only that initial level of integrity. For example, when the first trajectory data item D1 is FASDB1, and differs from the second trajectory data item D2 which is FASDB2, it means that one of FASDB1, FASDB2 is wrong. In this case, the comparison result R comprises the detection of an inconsistency.

In particular, according to the second embodiment, the comparison module 14 transmits only the comparison result R, but not the first or second trajectory data item D1, D2, to the transmission module 16.

The obtaining step 160 for the trajectory element T comprises generating the alert A by the transmission module 16 when the comparison result R comprises the detection of an inconsistency between the first trajectory data item D1 and the second trajectory data item D2.

The obtaining step 160 further comprises transmitting the first trajectory data item D1 or the second trajectory data item D2, presenting the initial level of integrity. For example, the first determination module 10 transmits the first trajectory data item D1 directly to the control system 4 in the obtaining step 160, as illustrated in FIG. 2.

During the obtaining step, the control system 4 receives, for example, the first trajectory data item D1 and the alert A, each presenting the initial level of integrity. The combination of the first trajectory data item D1 with the alert A, considered together, makes it possible to obtain the trajectory element T presenting the target level of integrity, because when no alert A is transmitted, the data item D1 is thus validated and corresponds to the obtained trajectory element T presenting the target level of integrity. When the alert A is transmitted, that indicates an inconsistency, thus avoiding any obtention of an inconsistent trajectory element T.

According to one example, the control system 4 obtains the trajectory element T at the target level of integrity as a result of receiving the alert A from module 16 and the first trajectory data item D1 from module 10. In this case, the control system 4 thus validates the first trajectory data item D1 as the trajectory element T in the absence of the alert A.

According to another example, the obtaining step 160 further comprises a display of the alert A and the first trajectory data item D1 to a pilot. In this case, the pilot validates the first trajectory data item D1 as a trajectory element T in the absence of the display of the alert A.

According to the second embodiment, the alert A is in particular dissimilar to the first trajectory data item D1. In particular, the alert A is generated by the transmission module 16 which is dissimilar to the module 10 generating the first trajectory data item D1. This makes it possible to obtain the trajectory element T at the target level of integrity from the alert A and the data item D1, each presenting the initial level of integrity.

Operation According to the Third Embodiment

The operation of the generation system 2 according to the third embodiment is now described with reference to FIG. 3.

The operation according to the third embodiment includes the same features as that of the second embodiment, except for the differences described below.

Also, the first and second example implementations apply for the third embodiment, if needs be modified according to the following.

The comparison step 150 is implemented by each comparison module 14A, 14B presenting the initial level of integrity.

According to the third embodiment, the first comparison module 14A compares, by a first predetermined comparison function, the first trajectory data item D1 with the second trajectory data item D2, to obtain a first comparison result R1, and transmits this result R1 to the first transmission module 16A. The second comparison module 14B compares, by means of a second predetermined comparison function, the first trajectory data item D1 with the second trajectory data item D2, to obtain a second comparison result R2, and transmits this result R2 to the second transmission module 16B.

The first comparison function is, in particular, different from the second comparison function. In particular, the first comparison module 14A is dissimilar to the second comparison module 14B. Preferably, the first transmission module 16A is further dissimilar to the second transmit module 16B.

The obtaining step 160 comprises generating and transmitting, by the module 16A, a first alert A1 when the first comparison result R1 comprises detecting an inconsistency between the first trajectory data item D1 and the second trajectory data item D2. The obtaining step 160 further comprises generating and transmitting a second alert A2, by the module 16B, when the second comparison result R2 comprises detecting an inconsistency between the data items D1 and D2. In particular, the modules 16A and 16B are dissimilar to each other.

The obtaining step 160 further comprises transmitting both the data item D1 by the module 10 and transmitting the data item D2 by the module 12, for example to the control system 4.

According to the third embodiment, the obtaining step 160 then comprises the transmission of four signals, namely A1, A2, D1 and D2. Each of these signals considered individually presents the initial level of integrity, but the comparison of the data items D1 and D2 transmitted by the modules 16A, 16B, makes it possible to obtain the trajectory element T, at the target level of integrity, in the absence of the alarms A1, A2. In particular, each of the signals A1, A2, D1 and D2 is dissimilar to each other due to its generation by modules that are different and dissimilar to each other.

The obtaining step 160 thus comprises, for example, in addition the reception, by the control system 4, of the alerts A1, A2, of the first trajectory data item D1 of the module 10, and of the second trajectory data item D2 of the module 12. In this case, the control system 4 thus validates the first or second trajectory data item D1, D2 as a trajectory element T in the absence of the alerts A1, A2, and after comparison of the data items D1, D2 received. The control system 4 controls the aircraft 1 only according to the trajectory element T when both the data items D1, D2 transmitted by the modules 10 and 12 are identical or consistent, and no alerts A1, A2 are transmitted.

According to another example, the obtaining step 160 further comprises displaying the alerts A1, A2 and the data items D1, D2 to a pilot. In this case, the pilot validates the data item D1 or D2 as a trajectory element T in the absence of the display of the alerts A1, A2.

According to the third embodiment, the first predetermined comparison function and the transmission of the first alert A1 are implemented by a first type of equipment E1 different from a second type of equipment E2 implementing the second predetermined comparison function and the transmission of the second alert A2. In this case, the target level of integrity is obtained, because the absence of the first alert A1 allows the validation of the data item D1 transmitted by the module 10, and the absence of the second alert A2 allows the validation of the data item D2 transmitted by the module 12. The comparison of the data items D1, D2 by the control system 4, for example, makes it possible to exclude errors in one of the equipment types E1, E2.

Alternatives of the generation method 100 and the generation system 2 are described below.

According to one alternative, the target level of integrity corresponds to a probability of occurrence of a failure different from $10^{-7}$, for example equal to $10^{-9}$. In this case, the initial level of integrity corresponds to a probability of occurrence of a failure equal to $10^{-7}$.

The first and second determination modules 10, 12 are optional modules. According to an unshown alternative, the comparison module 14 compares data directly from the first and second databases 6, 8, without transformation by the determination modules 10, 12. In this case, the first trajectory data item D1 is identical to the first initial data item, and the second trajectory data item D2 is identical to the second initial data item.

Alternatively, the trajectory element T does not comprise a final approach segment data block of an approach trajectory, but for example terrain or obstacle data, presenting the target level of integrity due to the comparison during the comparison step 150.

The preliminary step 105 and/or the validation step 170 is/are optional step(s).

The invention claimed is:

1. A method for controlling an aircraft, wherein said method is at least partially implemented by a generation system embedded on board the aircraft, said method comprising:
   receiving a first initial data item stored in a first database, the first database presenting a first predefined level of integrity, called initial level of integrity;
   receiving a second initial data item stored in a second database, the second database presenting said initial level of integrity, the first database being dissimilar with respect to the second database;
   comparing, by at least one predetermined comparison function, at least one first trajectory data item relating to the first initial data item with at least one second trajectory data item relating to the second initial data item, to obtain a comparison result;
   obtaining a trajectory element as a function of the comparison result, and as a function of at least one of the first trajectory data item and the second trajectory data item, the trajectory element presenting a second predefined level of integrity, called target level of integrity, the target level of integrity being strictly greater than said initial level of integrity; and
   controlling the aircraft according to the trajectory element.

2. The method according to claim 1, wherein the initial level of integrity corresponds to a probability of occurrence of a failure less than or equal to $10^{-5}$ per flight hour of the aircraft, and the target level of integrity corresponds to a probability of occurrence of a failure less than or equal to $10^{-7}$ per flight hour of the aircraft.

3. The method according to claim 1, wherein the obtaining is implemented by a transmission module transmitting the trajectory element comprising the first trajectory data item or the second trajectory data item, when the comparison result comprises a validation of the first trajectory data item and the second trajectory data item, the transmission module presenting the target level of integrity.

4. The method according to claim 1, wherein the obtaining comprises generating an alert by a transmission module when the comparison result comprises detecting an inconsistency between the first trajectory data item and the second trajectory data item, the obtaining step further comprising the transmission of the first trajectory data item or the second trajectory data item, presenting the initial level of integrity.

5. The method according to claim 1, wherein the comparing comprises comparing, by a first predetermined comparison function, the first trajectory data item with the second trajectory data item, to obtain a first comparison result, and comprising comparing, by a second predetermined comparison function different from the first predetermined comparison function, the first trajectory data item with the second trajectory data item, to obtain a second comparison result;
wherein the obtaining comprises the transmission of a first alert when the first comparison result comprises detecting an inconsistency between the first trajectory data item and the second trajectory data item, and comprising the transmission of a second alert when the second comparison result comprises detecting an inconsistency between the first trajectory data item and the second trajectory data item.

6. The method according to claim 5, wherein the first predetermined comparison function and the transmission of the first alert are implemented by a first type of equipment different from a second type of equipment implementing the second predetermined comparison function and the transmission of the second alert.

7. The method according to claim 1, wherein the trajectory element comprises a final approach segment data block of an approach trajectory toward a landing point of the aircraft.

8. The method according to claim 1, wherein the first initial data item and the second initial data item each comprise at least one element selected from the list constituted of: a position of a landing runway threshold, a terrain altitude data item, an approach slope, a landing runway heading, an altitude constraint of the aircraft, a speed constraint of the aircraft, a position of an obstacle and a radar signature.

9. The method according to claim 1, further comprising:
determining the first trajectory data item by applying a first transfer function to the first initial data item,
determining the second trajectory data item by applying a second transfer function to the second initial data item, the second transfer function being different from the first transfer function, each of the first and second transfer functions presenting the initial level of integrity.

10. The method according to claim 9, wherein the first transfer function is implemented by a type of equipment different from a type of equipment implementing the second transfer function.

11. The method according to claim 1, wherein at least one from among the following features defines that the first database is dissimilar the second database:

the first database is integrated in equipment of a first type, and the second database is integrated in equipment of a second type distinct from the first type;

the first database and the second database are formatted by respective data formatting, a type of the formatting of the first database being distinct from a type of the formatting of the second database;

the first initial data item is from a source different from the second initial data item;

the first initial data item is a data item that is stored by a first database management software, and the second initial data item is a data item that is stored by a second database management software, different from the first software.

12. The method according to claim 1, wherein all the following features define that the first database is dissimilar the second database:

the first database is integrated in equipment of a first type, and the second database is integrated in equipment of a second type distinct from the first type;

the first database and the second database are formatted by respective data formatting, a type of the formatting of the first database being distinct from a type of the formatting of the second database;

the first initial data item is from a source different from the second initial data item; and the first initial data item is a data item that is stored by a first database management software, and the second initial data item is a data item that is stored by a second database management software, different from the first software.

13. The method according to claim 1, wherein the generation method further comprises validating the trajectory element, the validating comprising displaying the trajectory element to a pilot and receiving a validation of the trajectory element by the pilot as a result of the display.

14. A system for An aircraft comprising a generation system for generating a trajectory element for controlling an aircraft according to the trajectory element, the generation system comprising a first database presenting a first predefined level of integrity, called initial level of integrity, and a second database presenting said initial level of integrity, the first database being dissimilar relative to the second database, the generation system being configured to implement a method comprising:

receiving a first initial data item stored in the first database;

receiving a second initial data item stored in the second database;

comparing, by at least one predetermined comparison function, at least one first trajectory data item relating to the first initial data item with at least one second trajectory data item relating to the second initial data item, to obtain a comparison result;

obtaining the trajectory element as a function of the comparison result, and as a function of at least one from among the first trajectory data item and the second trajectory data item, the trajectory element presenting a second predefined level of integrity, called target level of integrity, the target level of integrity being strictly greater than said initial level of integrity, the aircraft further comprising a control system for controlling the aircraft according to the trajectory element.

* * * * *